US011287635B2

(12) United States Patent
Sinclair et al.

(10) Patent No.: US 11,287,635 B2
(45) Date of Patent: Mar. 29, 2022

(54) MULTI-CHANNEL FOLDED OPTICAL SYSTEM

(71) Applicant: The Charles Stark Draper Laboratory, Inc., Cambridge, MA (US)

(72) Inventors: Matthew A. Sinclair, Stoneham, MA (US); Paul Aaron Bohn, Huntsville, AL (US); Juha-Pekka Laine, Boston, MA (US); Francis J. Rogomentich, Wilmington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/455,001

(22) Filed: Jun. 27, 2019

(65) Prior Publication Data

US 2020/0004006 A1    Jan. 2, 2020

Related U.S. Application Data (60) Provisional application No. 62/690,645, filed on Jun. 27, 2018.

(51) Int. Cl.
*G02B 23/02* (2006.01)
*G02B 17/08* (2006.01)
*H04N 5/225* (2006.01)
*G02B 5/08* (2006.01)

(52) U.S. Cl.
CPC .......... *G02B 23/02* (2013.01); *G02B 5/0825* (2013.01); *G02B 17/0808* (2013.01); *H04N 5/2254* (2013.01); *H04N 5/2258* (2013.01)

(58) Field of Classification Search
CPC .............. G02B 5/0825; G02B 17/0808; H04N 5/2254; H04N 5/2258
See application file for complete search history.

(56) References Cited

U.S. PATENT DOCUMENTS

| 5,452,054 A | * | 9/1995 | Dewa ................. G03F 7/70108 355/53 |
| 5,748,365 A | * | 5/1998 | Chen ...................... G02B 13/22 359/366 |
| 6,204,961 B1 | * | 3/2001 | Anderson ............... F41G 3/065 359/353 |
| 6,462,846 B1 | * | 10/2002 | DeLong ............... G02B 17/061 398/135 |
| 10,133,043 B1 | * | 11/2018 | Lu .......................... G02B 13/02 |
| 2007/0222854 A1 | * | 9/2007 | Pochapsky ............. G03B 33/12 348/33 |
| 2009/0051772 A1 | * | 2/2009 | Rhoads .................. G02B 7/005 348/187 |
| 2012/0147912 A1 | * | 6/2012 | Moench .................... H01S 5/14 372/29.02 |
| 2016/0187639 A1 | * | 6/2016 | Granger ................. G02B 23/16 359/364 |
| 2016/0344955 A1 | * | 11/2016 | Jungwirth ............. H04N 5/3572 |
| 2017/0299855 A1 | * | 10/2017 | Squires .................. G02B 17/08 |
| 2018/0017787 A1 | * | 1/2018 | Johnson ................. G02B 23/04 |

* cited by examiner

*Primary Examiner* — Thai Q Tran
*Assistant Examiner* — Jose M Mesa
(74) *Attorney, Agent, or Firm* — HoustonHogle LLP (57) ABSTRACT

An optical system such as an imaging system, projecting system or combined imaging and projecting system, has complex dielectric coatings and/or reflecting polarizers to separate multiple spectral bands and/or polarizations on one or more of the system's curved mirrors.

20 Claims, 11 Drawing Sheets

Cassegrain (Prior Art)
Fig. 1A

Modified Gregorian (Prior Art)
Fig. 1B

MULTI-CHANNEL FOLDED OPTICAL SYSTEM

RELATED APPLICATIONS

This application claims the benefit under 35 USC 119(e) of U.S. Provisional Application No. 62/690,645, filed on Jun. 27, 2018, which is incorporated herein by reference in its entirety.

BACKGROUND OF THE INVENTION

While refractive lenses in telescopes have many advantages, they do suffer from chromatic aberration. Therefore, many newer telescope designs, especially telescopes operating across wide spectral bands or operating in spectral bands where refractive optics become expensive, rely heavily on reflective surfaces, both aspheric, spherical, and flat, for sharper focusing and ease of manufacturing. Moreover, reflective telescopes can have lower mass than refractive ones.

The designs can be made athermal (i.e., insensitive to temperature fluctuations) by fabricating telescope components from material that responds to temperature fluctuations negligibly (low thermal coefficient of expansion) or identically to temperature fluctuations in terms of expansion and contraction. For example, athermalization is achieved in traditional Cassegrain telescopes by making the spacer between the primary and secondary mirrors and the mirrors themselves of the same material such that as the mirrors change power from temperature, the focal point remains the same due to the spacer shifting due to the same temperature change.

Wavelength-channel separation can be achieved using polarization, dielectric or Bragg mirrors/beamsplitters. These enable different spectral bands to be separated and then detected. A similar approach is used for polarization sensitive systems using polarization beamsplitters.

When images of different spectral bands are acquired from a common field of view (or a target), the best way to represent the entire data collection is to register all the images with each other and create a single image cube, e.g., hyperspectral cube, which is intensity as a function of the two-dimensional pixel coordinates and the spectral bands define the third dimension, from the collection of images.

Creating an image cube from multiple images is not an easy task as each sensor for each spectral band may have its own pixel size and viewing direction. Furthermore, the pixel size and viewing direction may even vary in a single image.

SUMMARY OF THE INVENTION

One way to simplify or eliminate image registration issues is to acquire images in the different spectral bands with a common boresight. This approach also renders the system more robust against vibration since the vibration affects the different images similarly. The word "image" is used to describe where a detector (image sensor or focal plane array, spectrometer, diode, etc.) or emitter (LED, laser, etc.) may be used in place.

The invention concerns optical systems, such as optical imaging and/or projection systems, with potentially improved thermal characteristics (athermal, temperature insensitive) and potentially improved pressure insensitivity. The systems might use diamond-turned and/or molded (plastic) concave and convex mirrors as part of the imaging and/or projection system to minimize unwanted dispersion and enable athermalization.

In another aspect, wavelength specific dielectric-coated or nano-patterned reflecting surfaces can be used for achieving multiple focal lengths.

The present system can be applied to possibly small, gimballed, multi-sensor systems with a shared aperture for two or more of the image sensors. Implementations of the invention achieve low SWaP (Small Weight And Power) by using mirror based folded optics for multi-spectral image sensors. Applications include intelligence, surveillance, target acquisition and reconnaissance (ISTAR). In addition, it can be used for guiding autonomous vehicles such as unmanned aerial vehicles (UAVs) and automobiles. In terms of guidance and navigation, it could be further used as multi-band star trackers for UAVs or satellites or other space vehicles.

In general, according to one aspect, the invention features an optical system, comprising a first mirror substrate having a primary mirror and a tertiary mirror and a second mirror substrate opposing the first mirror substrate and having a secondary mirror and a quaternary mirror. Then, at least one mirror of only one of the mirror substrates is aspheric and the mirrors of the other mirror substrate are flat or spherical. In this way, the system is rendered more robust and tolerant to thermal and vibration effects. It can also be provide reduced manufacturing tolerances.

In many embodiments, the primary mirror and the tertiary mirror are aspheric. The secondary mirror and the quaternary mirror might be flat or spheric.

The optical system can be employed as an imaging system, projection system or a combined imaging and projecting system.

In some cases, complex dielectric coatings are helpful. They might comprise at least one dichroic mirror separated from another mirror by a separation layer. In other cases, the complex dielectric coating comprises at least a first dichroic mirror, separated from a second dichroic mirror separated from another mirror by respective separation layers. In other cases, the dielectric coating might be replaced with nano-patterned coating for polarization and/or wavelength selectivity.

Some embodiments employ a lens for conditioning light passing through an aperture in the first mirror substrate. In some designs, the lens has at least one aspheric surface.

Baffles can be used between the primary mirror and the tertiary mirror and/or between the secondary mirror and the quaternary mirror. Further some designs have a piston for translating the second mirror substrate relative to the first mirror substrate.

An articulated fold mirror, or prism, can be mounted in front of the optical system. Another option is a Risley prism.

The system might specifically operate as a multi-band star tracker.

In addition, the optical system might have a circular or a segmented-circular profile, or otherwise.

In general, according to another aspect, the invention features an optical system comprising four curved mirrors, in which two of the curved mirrors, having complex surfaces, are located on a common substrate.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
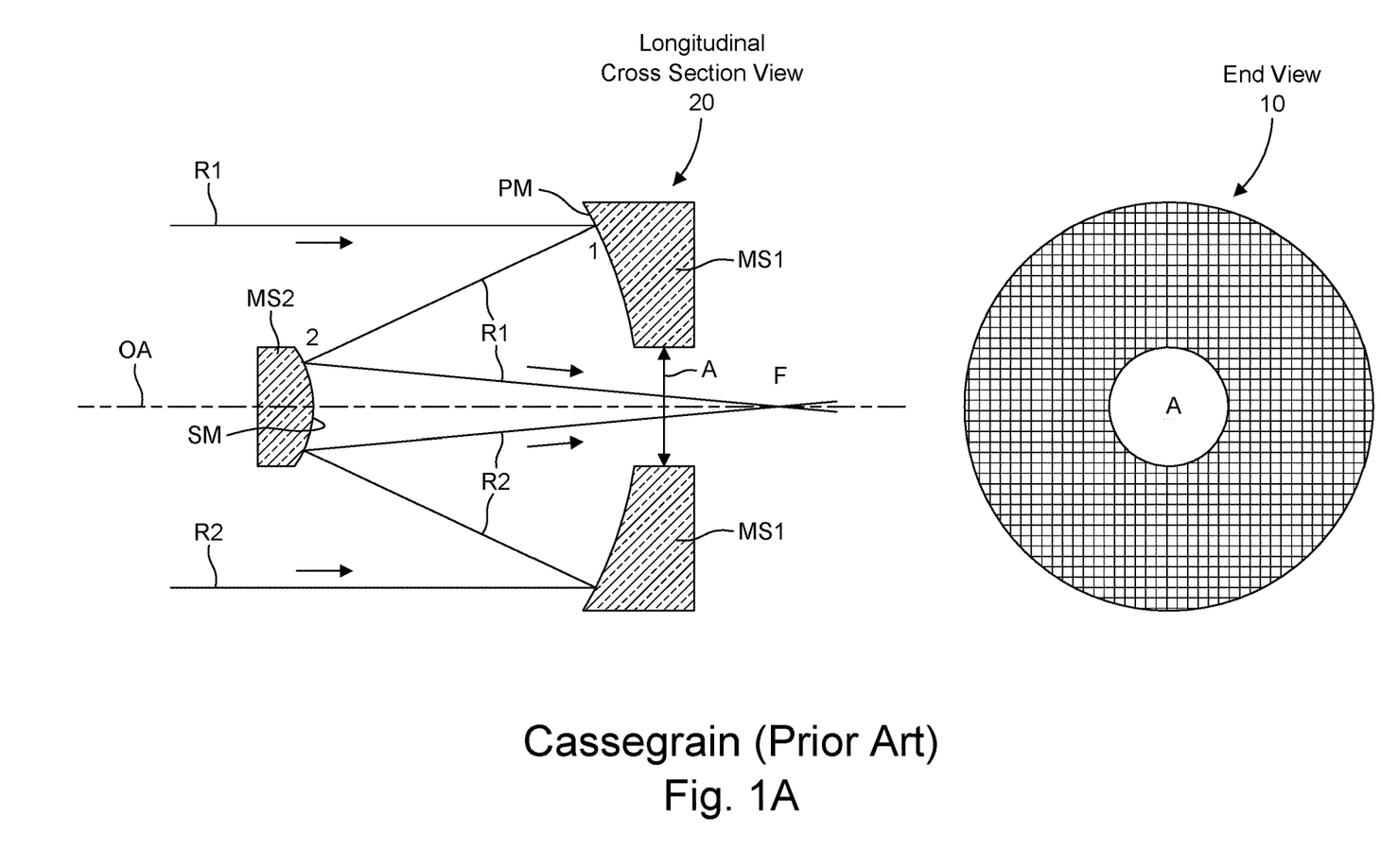
FIG. 1A is a longitudinal cross sectional view (sliced length-wise in half) of a classic Cassegrain telescope design (prior art). Also shown is an end view (along the optical axis) of the concave reflective mirror and the aperture.

FIG. 1A is a longitudinal cross section of a Cassegrain telescope 20. As is characteristic of this design, a round concave primary mirror PM has an aperture (hole) A at its center. The aperture extends through the mirror substrate MS1 that carries the primary mirror PM. The primary mirror PM and its aperture A are best visualized by inspecting the end view (inset), where the backside of the mirror substrate MS1 of primary mirror PM is represented as an annular region. The end view 10 is perpendicular to the optical axis OA of the telescope 20.

Two parallel incoming rays R1 and R2 from a great distance, also parallel to and co-planar with the optical axis OA, are shown being reflected off the concave primary mirror PM, at the top and bottom edges of the primary mirror PM, respectively. To avoid clutter only the path of ray R1 is discussed in detail using reference numbers and letters. The path of ray R2 is completely analogous.

Following reflection off the concave primary mirror PM at point 1, R1 is reflected off a convex secondary mirror SM at point 2. Similarly, R2 is reflected off concave primary mirror PM and then reflected off of the convex secondary mirror SM. Both R1 and R2 are then directed though the aperture A and come to a focus at focal plane F.

Another classic telescope design is the Gregorian telescope (not shown) where the secondary mirror is concave.

Figure 1B:
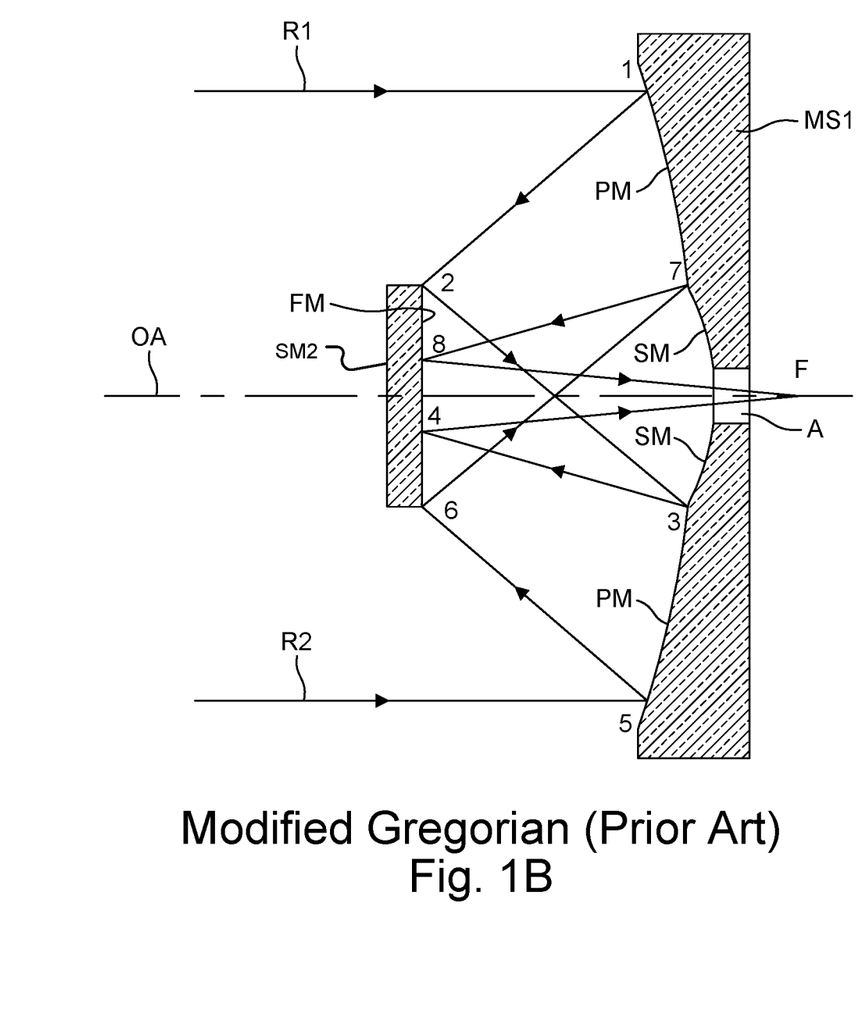
FIG. 1B shows a longitudinal cross sectional view of a modified Gregorian telescope design (prior art). Unlike a typical Gregorian telescope, there is a third mirror which is used as an erecting mirror for the image.

FIG. 1B is a diagram of a telescope which can be viewed as a modification of either the Cassegrain telescope design and/or the Gregorian telescope design. This folded design adds a fold or relay mirror FM between a primary mirror PM and the secondary mirror. The primary mirror and secondary mirror SM are formed on the same mirror substrate MS1.

In more detail, consider two extremal rays R1 and R2, impinging on the outer edges (top and bottom) of the primary mirror PM. Again, rays R1, R2 and the optical axis OA are parallel and co-planar. Since the flight paths of both rays R1 and R2 are similar, only the flight of ray R1 is discussed in detail.

Ray R1 is reflected at point 1 on the concave surface of the primary mirror PM. The reflected ray then strikes point 2 which lies on fold mirror FM formed on the second mirror substrate SM2. The ray is then reflected to a concave mirror secondary mirror SM formed on the first mirror substrate MS1. At the concave secondary mirror SM, the ray R1 strikes point 3, where it again undergoes a reflection and is directed back to the flat fold mirror FM at point 4. From point 4, the reflected ray passes through the aperture A.

Ray R2 undergoes a similar pattern of reflections (at points 5, 6, 7 and 8) before being transmitted through the aperture A.

Upon exiting through the aperture A, rays R2 and R1 focus at the focal or image plane F.

A number of problems exist with this folded design that make it inappropriate for some systems, however. Generally, this folded design will suffer from stray light coming into the system and blinding the sensor. Typically, this type of problem can be addressed with baffles but using a flat fold mirror will not allow for a baffle since it would block light and create aberrations from unwanted vignetting.

Another problem is relative illumination. Generally, Gregorian and Cassegrain designs suffer from relative illumination issues across the field of view. They often drop by over 40% relative illumination from center to the far edge.

Figure 1C:
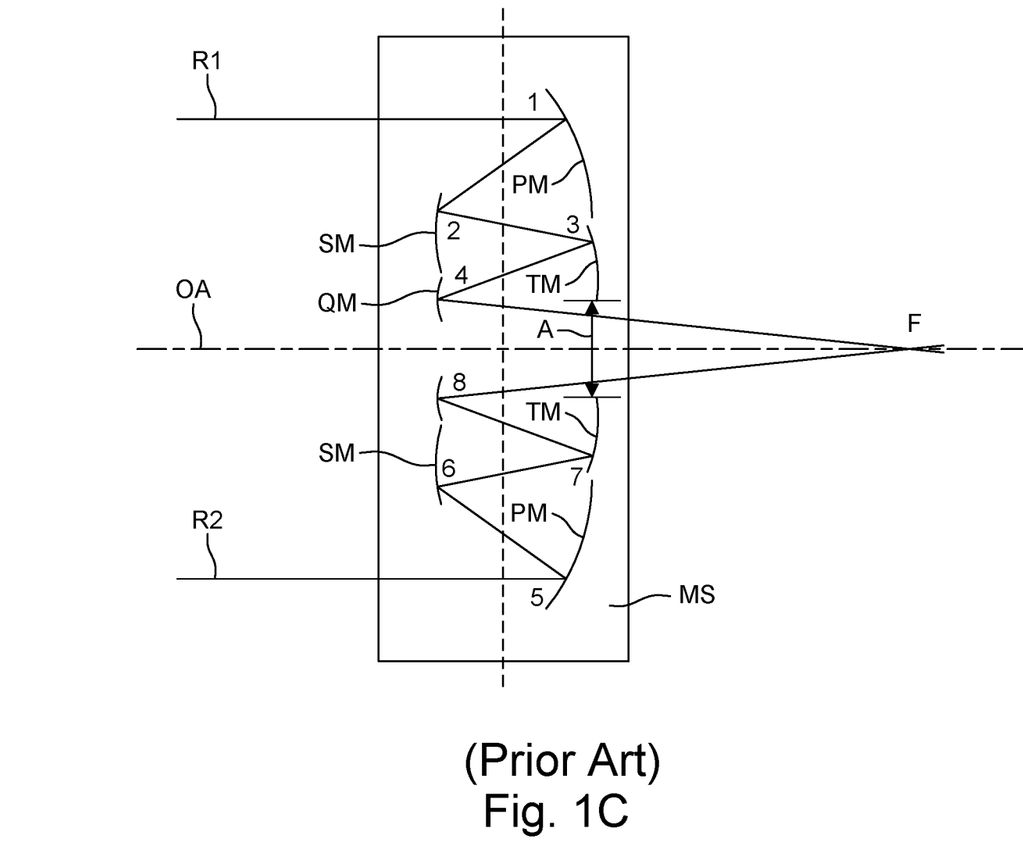
FIG. 1C shows a longitudinal cross sectional view of a prior art folded solid telescope that is similar to the classic Cassegrain design.

FIG. 1C shows another telescope design, which is both folded and solid.

This folded solid telescope is based on modifications to the classic Cassegrain telescope. Here, the several mirrors are formed on opposed sides of a single transparent substrate MS. The design is similar in the sense that it folds a Cassegrain over again, but different in that the elements are catadioptric themselves. The mirrors are created by cutting into the transparent substrate MS from the opposite direction the light hits the mirrors.

The primary mirror PM is concave. Back secondary mirror SM, tertiary mirror TM and quaternary mirror QM are all concave and aspheric.

In more detail, consider two rays R1 and R2, impinging on the outer edges (top and bottom) of the primary mirror PM. Rays R1, R2 and the optical axis OA are parallel and co-planar. R1 reflects off of the primary mirror PM (at point 1) to the concave secondary mirror SM (at point 2) and is then directed to the concave tertiary mirror TM (at point 3). From tertiary mirror TM, R1 is reflected off to concave quaternary mirror QM (at point 4) and then through the aperture A to focal plane at F.

In general, this folded solid telescope design leads to a number of issues. The fact that it is solid makes designing a broadband/hyperspectral system difficult. Further, the design has very high tolerances due to the use of aspheric mirrors. This creates many issues with transmission and reflections, and will often require compensators.

Figure 2A:
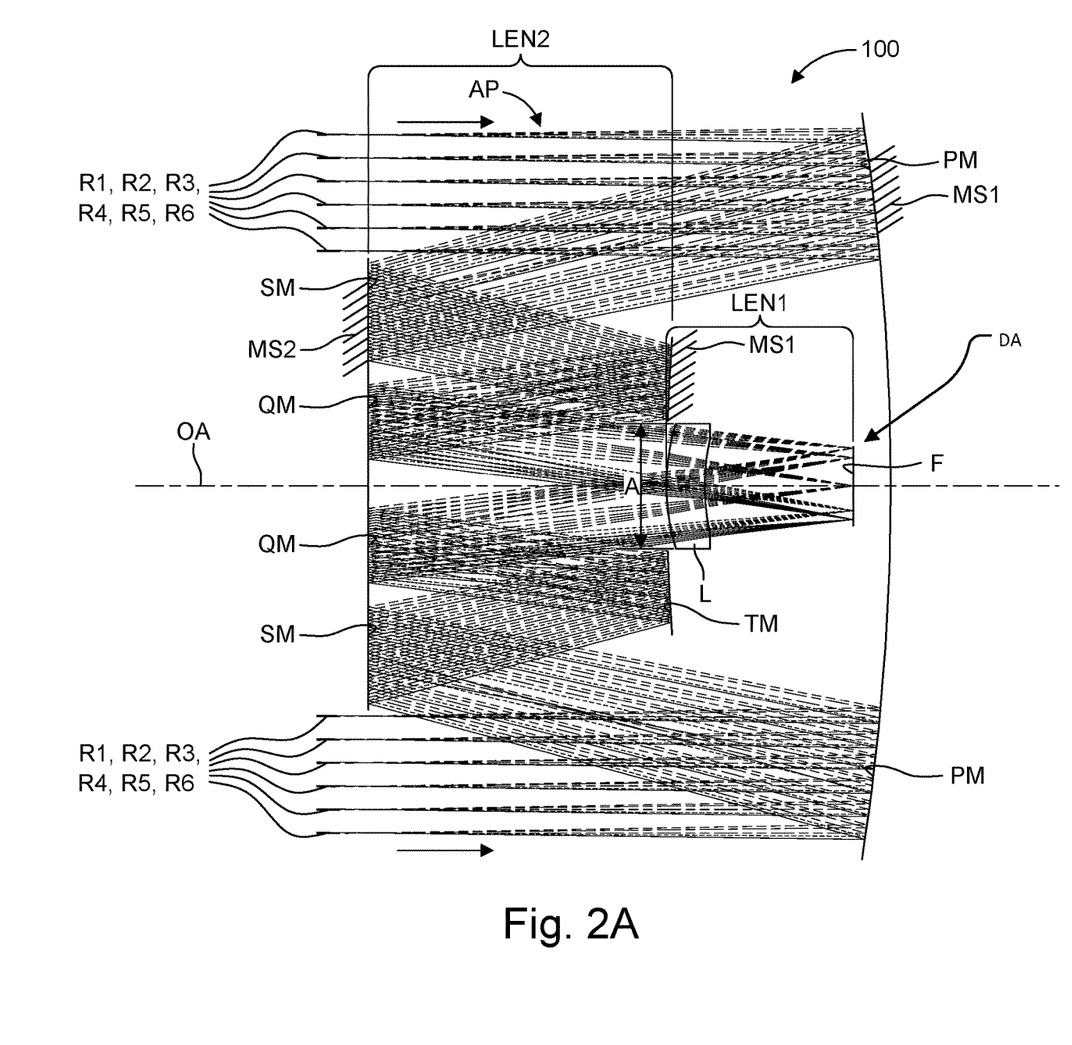
FIG. 2A shows a longitudinal cross sectional view of a catadioptric telescope or imaging or projecting optical system as an embodiment of the current invention, with multiple mirrors of various curvature (including flat mirrors, i.e., zero curvature) and a focusing lens. Also shown are paths of rays traced from different angles to specific points) at the image plane.

FIG. 2A shows a longitudinal cross section view of a catadioptric telescope optical system according to the present invention. Although the following description mainly applies to the system's use as an imaging system, it is equally useful for a projecting system or a combined imaging and projecting system.

The illustrated telescope design also provides for multispectral band focusing, e.g., bands F1, F2, F3, F4 and F5, through a common aperture AP.

In this example the primary mirror PM is concave and fabricated by coating the first mirror substrate MS1 with a complex dielectric coating.

Figure 2B:
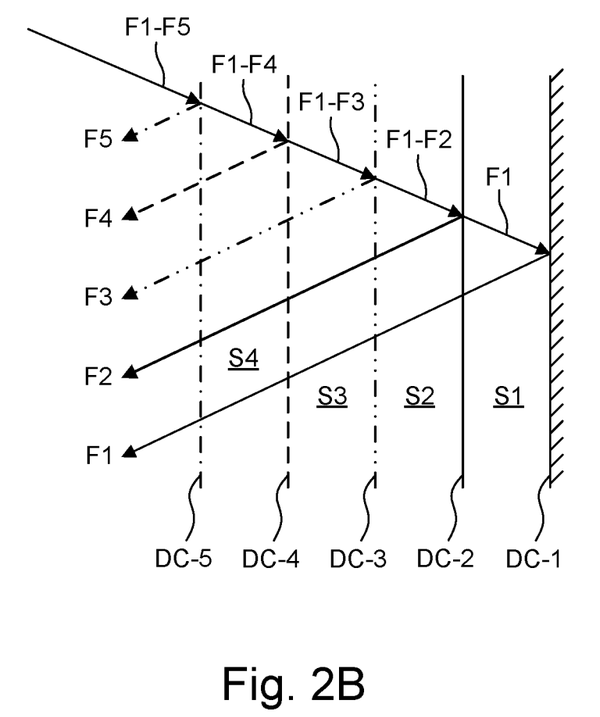
FIG. 2B illustrates the side view of a mirror with layers of dichroic mirrors made from dielectric layers where each mirror reflects a particular spectral band while being transparent to other bands to thereby create a multi channel system.

FIG. 2B shows an exemplary complex dielectric coating of the primary mirror PM. The complex dielectric coating includes a first metal or dielectric coating DC-1, a second dielectric coating DC-2, a third dielectric coating DC-3, a fourth dielectric coating DC-4 and a fifth dielectric coating DC-5, sequentially applied in the order indicated. The layers are separated from each other by transmissive separation layers S1, S2, S3, S4, to control the geometry of and spacing between dielectric coating layers DC-1, DC-2, DC-3, DC-4 and DC-5. For illustrative purposes only five layers are applied to the first mirror substrate, although more or less are possible in principle.

In the figure, incident light, including five spectral or wavelength bands, F1 through F5, for example, is incident on the primary mirror PM. When the incident light reaches coating DC-5, the fifth dielectric coating is designed to be a dichroic mirror that reflects off light of spectral bands F5, while allowing for transmission of bands F1 through F4 and through separation substrate S4. When the transmitted light is incident on the fourth coating DC-4, the fourth dielectric coating is designed to be a dichroic mirror that reflects off light of spectral band F4, while allowing for transmission of the bands F1 through F3 and their transmission through separation layer S3. Similarly, the third dielectric coating DC-3 is designed to be a dichroic mirror that reflects off light of spectral band F3 while allowing spectral bands F1 and F2 to pass through the third dielectric coating DC-3 and the separation layer S2, unattenuated. Next, the second dielectric coating DC-2 functions as a dichroic mirror that reflects off spectral band F2 while allowing just the light of spectral band F1 to pass through it and separation layer S1. Finally, the light of spectral band F1 is reflected by coating DC-1, which can be a dielectric or metal coating on the first mirror substrate MS1. (Note that in the ray tracing diagram of FIG. 2B, which is meant to be qualitative, refraction effects are ignored as light propagates through the layers.)

The separations and sharpness of focusing of spectral bands F through F5 depends on the thicknesses and refractive indices of separation layers S1-S4 and properties of the dielectric coatings DC-1 through DC-5. In general, the dielectric coatings DC-1 through DC-5 each constitute what is known as an interference or Bragg mirror/beamsplitter, which is a type of mirror composed of multiple thin layers of dielectric material. The layers alternate between high and low refractive index material and have thicknesses on the order of the wavelength of the light. By careful choice of the type and thickness of each of the dielectric layers, one can design an optical dichroic coating with specified transmission/reflection of different wavelengths of light.

In other embodiments, patterned optical surfaces are used in place of one or more or all of the dichroic coatings DC-1, DC-2, DC-3. DC-4, and DC-54. For example, nano-patterns etched into each of the spacer layers S1-S4 are designed to modify polarization and/or focus in a wavelength dependent manner.

Returning to FIG. 2A, the figure shows pencils of light (rays) R1, R2, R3, R4, R5 and R6 from a great distance but diverging slightly and being collected on and reflected off the primary mirror PM (or its coatings DC-1 though DC-5). Each ray consists of all spectral bands (in principle). The rays R1 through R6 are parallel to each other and the optical axis OA, and are co-planar.

The dielectric-coated primary mirror PM formed on first mirror substrate MS1, separates out wavelengths or spectral bands, which are separately reflected to a secondary mirror SM formed on a second mirror substrate MS2, which then reflects each wavelength to a concave tertiary mirror TM, which is preferably formed in the first mirror substrate MS1. From the tertiary mirror TM, the bands of light are reflected to a quaternary mirror QM formed in the second mirror substrate MS2. The quaternary mirror QM then reflects off the bands through the aperture A in the first mirror substrate MS1 to the convex side of a lens L having a convex side and a concave side. Finally, upon refraction through the lens L, the separate spectral bands of the light are focused at the focal plane F, where one or more spatially resolved image sensors and/or single detectors are located, in one example.

The aspheric lens L is made of material that allows for sufficient transmission for all bands being imaged. Possible materials are ZnS, ZnS multispectral (Cleartran), ZnSe, sapphire, germanium, salts (examples: NaCl, KBr), fluoride (examples: CaF_2, BaF_2, MgF_2), etc. Using aspheric lens L (such as parabola, conic surfaces, and aspheric coefficients) at the aperture A before focusing reduces aberrations.

The second mirror substrate MS2 can be a single piece of material, on which both the secondary mirror SM and the quaternary mirror QM are formed or deposited. Alternatively, the secondary mirror can be fabricated on a substrate that is different from a movable substrate that carries the quaternary mirror QM. Thus, the quaternary mirror QM can be moved along the optical axis OA to change length LEN2 for focusing.

It is important to note that the primary mirror PM and the tertiary mirror TM are machined or molded out of a single piece of material, i.e., first mirror substrate MS1. This allows for the tolerances to be very tight: less than 10 microns decentration, less than 25 microns of piston, and less than 5 microns of wedge between the two surfaces.

The secondary mirror SM and the quaternary mirror QM are preferably created in a similar manner to the primary mirror PM and the tertiary mirror TM. That is secondary mirror SM and the quaternary mirror QM are machined or molded out of a signal piece of material or second mirror substrate MS2.

The design approach here is to push all of the unique and complex surfaces and elements to one mirror substrate, such as the first mirror substrate MS1. Examples of such surfaces and elements include aspheric mirrors, toroidal mirrors, diffraction gratings, and complex dielectric coatings.

On the other hand, the second mirror substrate MS2 has no complex surfaces. Its elements are preferably either spherical or flat.

In the illustrated example, since secondary mirror SM and the quaternary mirror QM are flat or spherical and the primary mirror PM and the tertiary mirror TM are complex, i.e. aspheric curvatures, the tolerances between the first mirror substrate MS1 and the second mirror substrate MS2 are less sensitive to placement error to obtain a quality image.

In one implementation, a spatially resolved image sensor is located at focal plane F, or even a single detector could be used. On some examples, a detector assembly DA is used. Here, the different spectral bands are separated by dichroic mirrors, to be separately detected by different spatially resolved image sensors, each sensor being optimized to detect photons of different spectral bands.

Figure 2C:
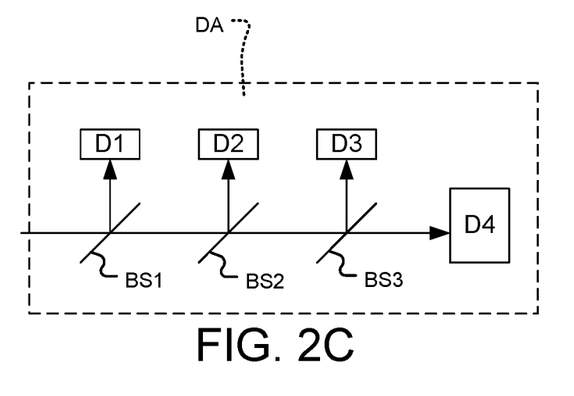
FIG. 2C is a schematic diagram showing one possible arrangement for the detection assembly.

FIG. 2C shows one possible arrangement for a detection assembly DA.

Here the visible is split off by a first beamsplitter BS1, which only reflects the visible, to the visible image sensor D1. The SWIR/NIR (short wave infrared and near infrared) light is split off by a second beamsplitter BS2, which only reflects the SWIR/NIR, to the SWIR/NIR image sensor D2. The MWIR (mid-wave infrared) is split off by a third beamsplitter BS3, which only reflects the MWIR, to the MWIR image sensor D3. Finally, the LWIR (long wave infrared) passes through all the beamsplitters BS1-BS3 to the LWIR image sensor D4.

In one example, the visible image sensor D1 has at least 1600×1200 pixel focal plane array and is a CMOS image sensor.

A SWIR/NIR image sensor D2 has at least a 640×512 InGaAs image plane pixel array.

A MWIR image sensor D3 is a HgCdTe detector with an integrated dewar cooler assembly. One example has 1280× 720, with a 12 μm pitch, focal plane pixel array.

A LWIR image sensor D4 is a 12 μm pitch vanadium oxide (VOx) uncooled detector, having at least a 640×512 or 320×256 focal plane pixel array.

On the other hand, a multi spectral band light source or light sources could be placed at the focal plane F to convert the system to a projecting system. In addition, a hybrid imaging and projecting system is optionally created by using dichroic mirrors to couple light from a light source into the beam path while also detecting incoming light with one or more image sensors.

Figure 3:
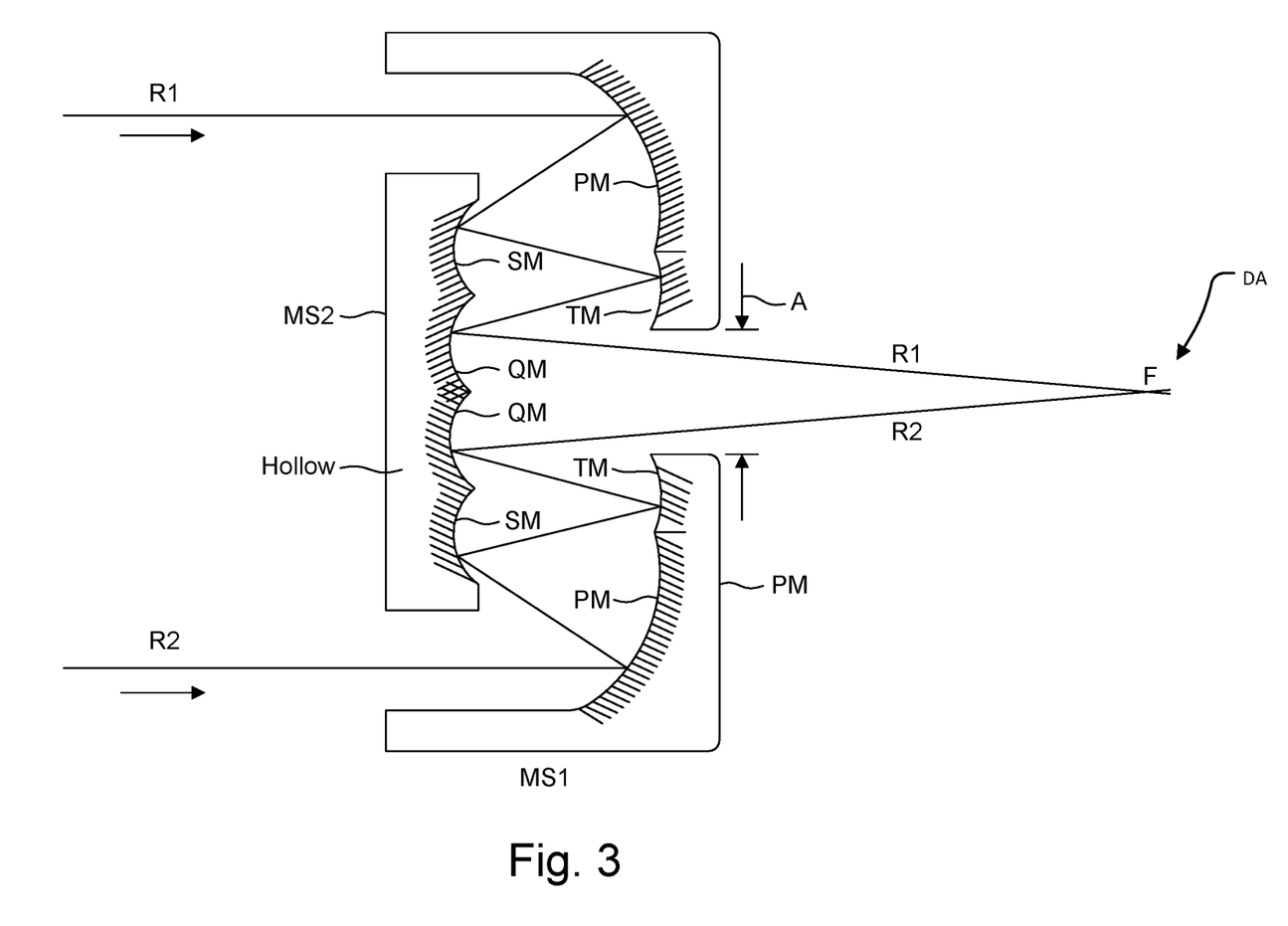
FIG. 3 is a longitudinal cross sectional view of a folded imaging optical system fabricated using diamond turning and/or molded plastic mirror substrates.
Figure 4:
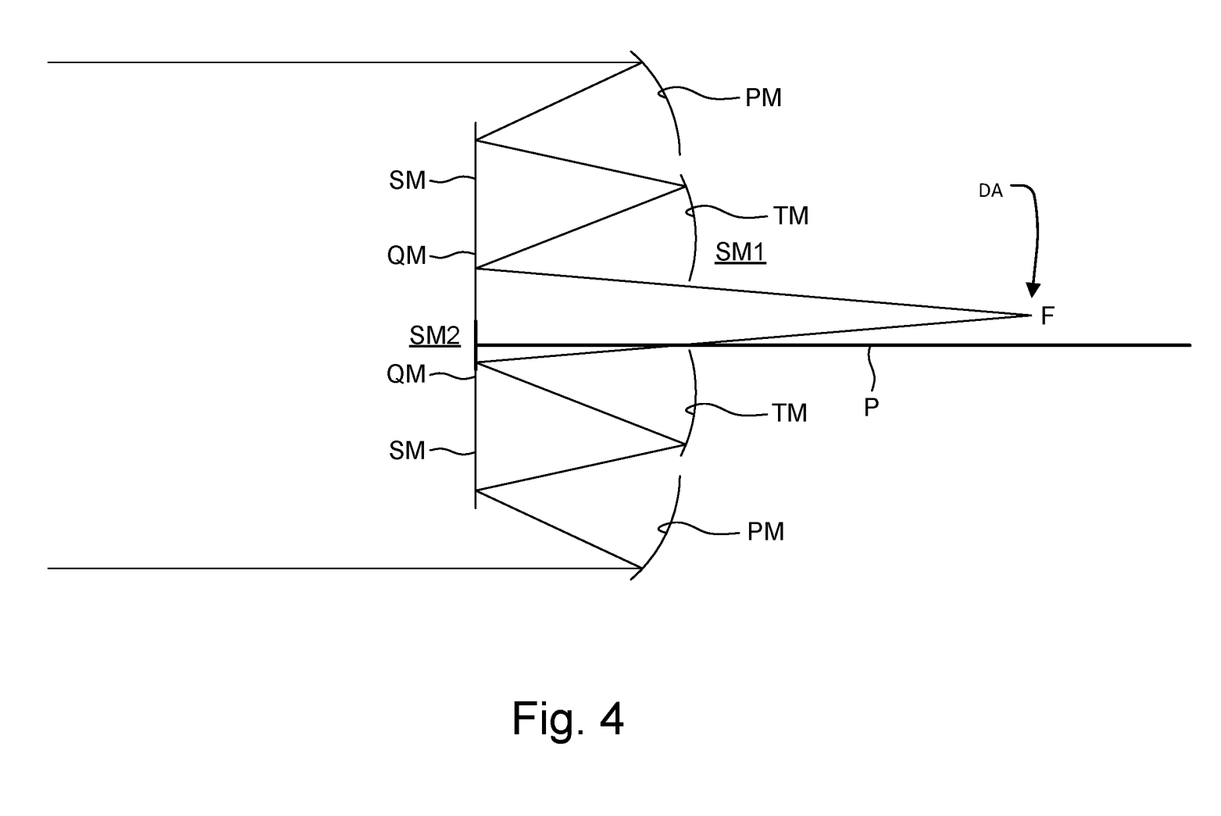
FIG. 4 is a longitudinal cross sectional view of a folded imaging optical system with a piston-driven mirror substrate for the secondary and quaternary mirrors.
Figure 5:
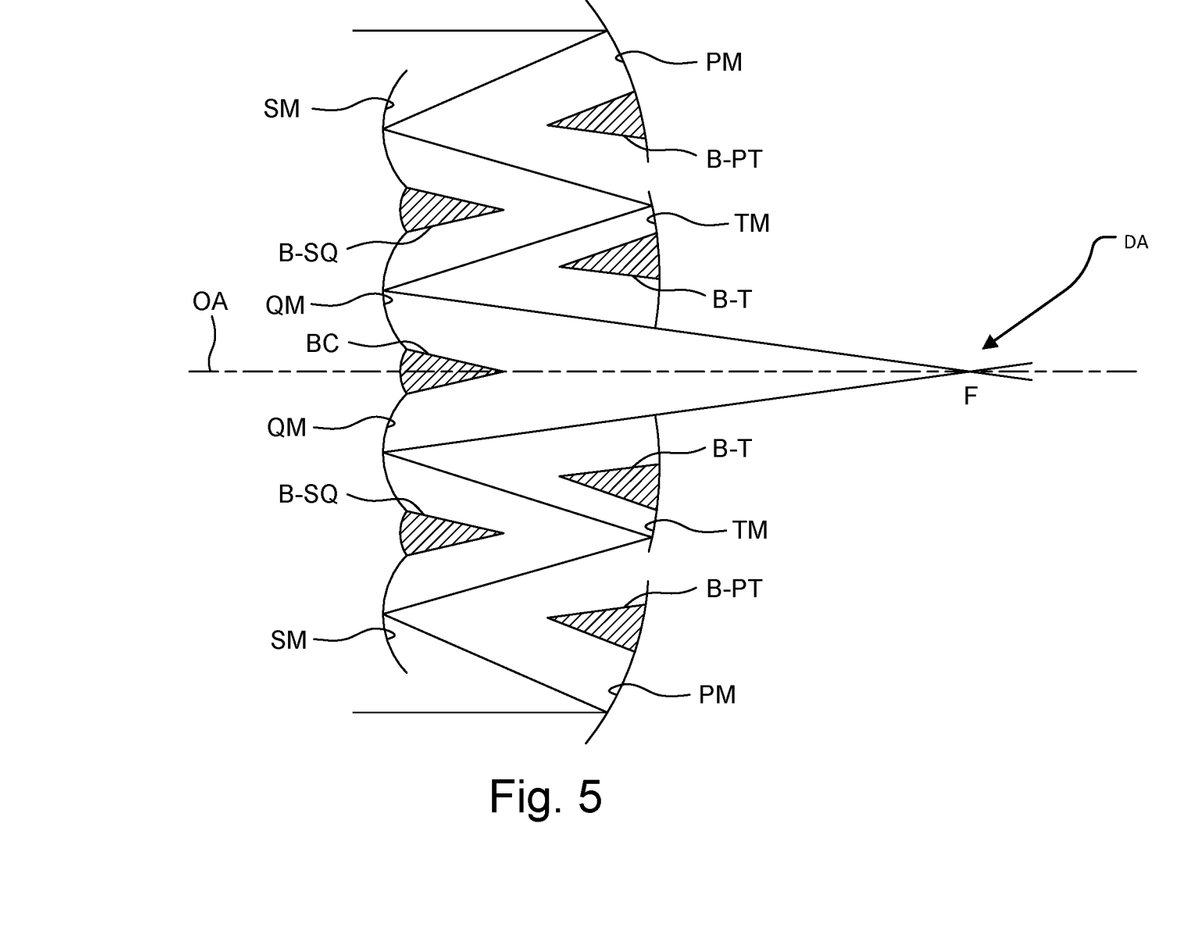
FIG. 5 is a longitudinal cross sectional view of a folded imaging optical system with spherical secondary and quaternary mirrors to increase tolerances. The surfaces may have a DOE (diffractive optical element) and/or a HOE (holographic optical element) to manage dispersion. The figure also shows baffles to control stray light.

FIGS. 3 through 5 illustrate additional telescope optical system designs. Here, the mirror substrates can be manufactured using diamond turning or plastic molding of diamond turned molds. In these designs, dielectric coating or lenses are needed. The mirrors can be fabricated from silver oxide, silicon nitride, metals like aluminum, or some other reflecting dielectric material on the mirror substrates.

Nevertheless, it must be noted that optionally layers of dielectric coatings can be used as shown in FIGS. 2A and 2B for the primary mirror for wavelength separation and multiple focusing to thereby provide a unique focus point for each spectral band. Moreover, separate detectors in a detector assembly DA, as described in connection with FIG. 2C would then be used to separately detect the different bands.

Additionally, diffractive and holographic optical elements (DOE and HOE) can be attached to mirrors, such as the primary mirror PM or tertiary mirrors TM to add dispersion and correct dispersion.

In more detail, FIG. 3 is a longitudinal cross sectional view of a catoptric imaging optical system according to another embodiment of the present invention.

Here also, the primary mirror PM is concave and fabricated by coating the first mirror substrate MS1, which also carries the tertiary mirror TM.

Both the primary mirror PM and the tertiary mirror TM have complex aspheric surfaces and possibly elements such as a DOE or HOE.

The primary mirror reflects light to a secondary mirror SM on the second mirror substrate MS2, which then reflects the light to a concave tertiary mirror TM, which is preferably formed in the first mirror substrate MS1. From the tertiary mirror TM, the light is reflected to a quaternary mirror QM formed in the second mirror substrate MS2. The quaternary mirror QM then reflects the light through the aperture A in the first mirror substrate MS1.

In this design, the primary mirror PM and the tertiary mirror TM are aspheric and thus complex curvatures. On the other hand, the secondary mirror SM and the quaternary mirror QM have simple concave spherical curvatures. As a result, the first mirror substrate MS1 will typically be fabricated from diamond turning or plastic molding of diamond turned molds. On the other hand, the second mirror substrate can be manufactured using simpler, less expensive techniques. Moreover, the tolerance between the first mirror substrate MS1 and the second mirror substrate MS2 are lower.

There are several advantages to the diamond turned moldable mirror construction over traditional manufacturing. First, the design is scalable from large to small telescopes and cheaper than traditional "all glass" design. Moldable design allows for complex surfaces and multiple reflections, and choices of various other experimental designs.

FIG. 4 is a modification of the embodiments of FIG. 2A or 3 where the second mirror substrate SM2 is controllable with a piston P. The piston P can tilt relative to and translate the second mirror substrate SM2 along the optical axis.

FIG. 5 shows that baffles may be added to the optical system in the illustrated examples, which is rotationally symmetric about the optical axis OA. The baffles are coated or made from a black wide band absorbing material.

In particular, a primary/tertiary mirror baffle B-PT is added between the primary mirror PM and the tertiary mirror TM. The primary/tertiary mirror baffle B-PT projects away from the first mirror substrate MS1 toward the second mirror substrate MS2.

A secondary/quaternary mirror baffle B-SQ is added between the secondary mirror SM and the quaternary mirror QM. The secondary/quaternary mirror baffle B-SQ projects away from the second mirror substrate MS2 toward the first mirror substrate MS1.

Further, a tertiary mirror baffle B-T is added between the tertiary mirror TM and the aperture A. The tertiary mirror baffle B-T projects away from the first mirror substrate MS1 toward the second mirror substrate MS2.

Finally, a center mirror baffle B-C is added at the center of the quaternary mirror QM along the optical axis. It projects away from the second mirror substrate MS2 toward the aperture A.

Figure 6A:
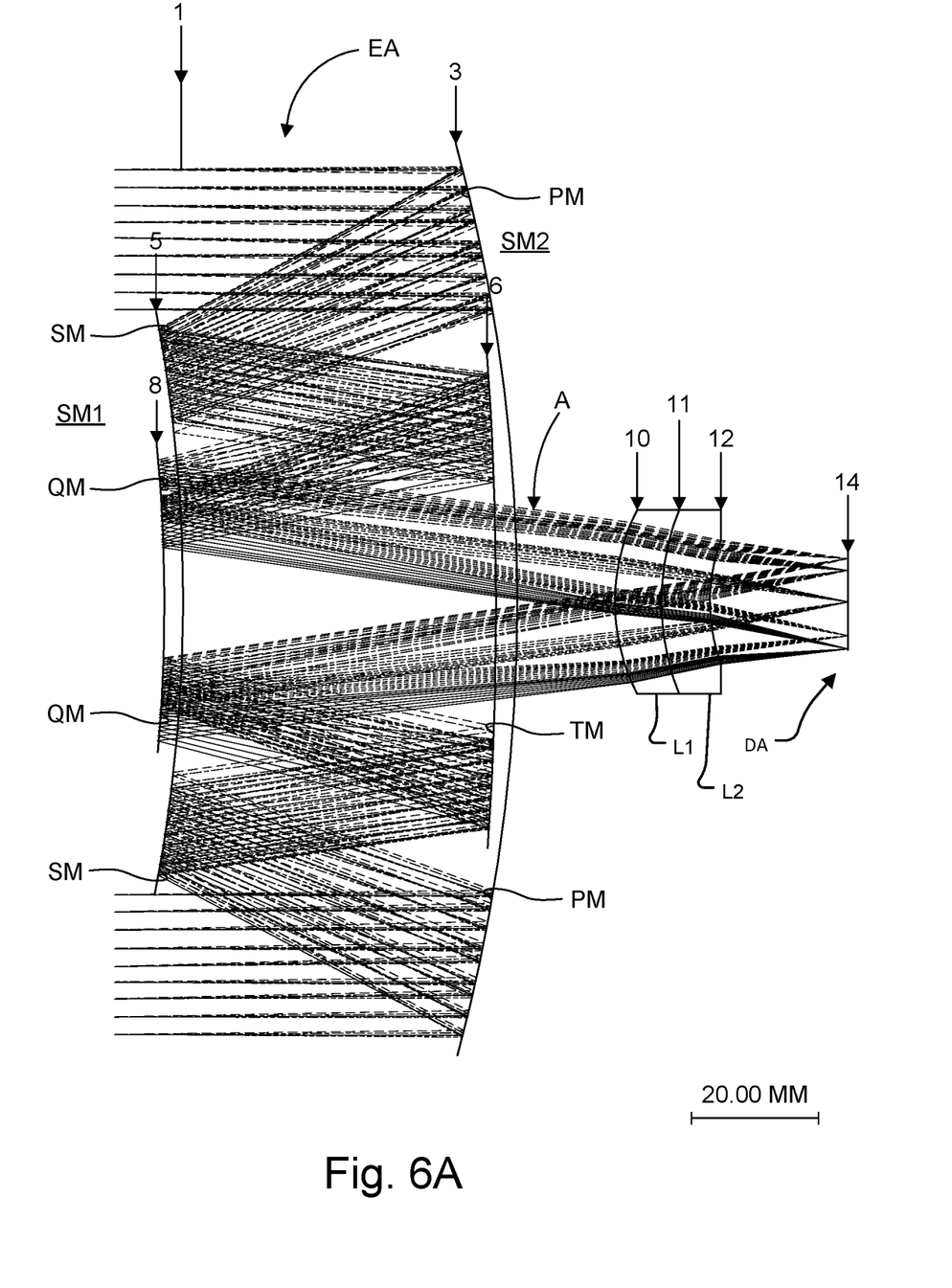
FIGS. 6A and 6B are longitudinal cross sectional views of an example visible folded catadioptric optical system.
Figure 6B:
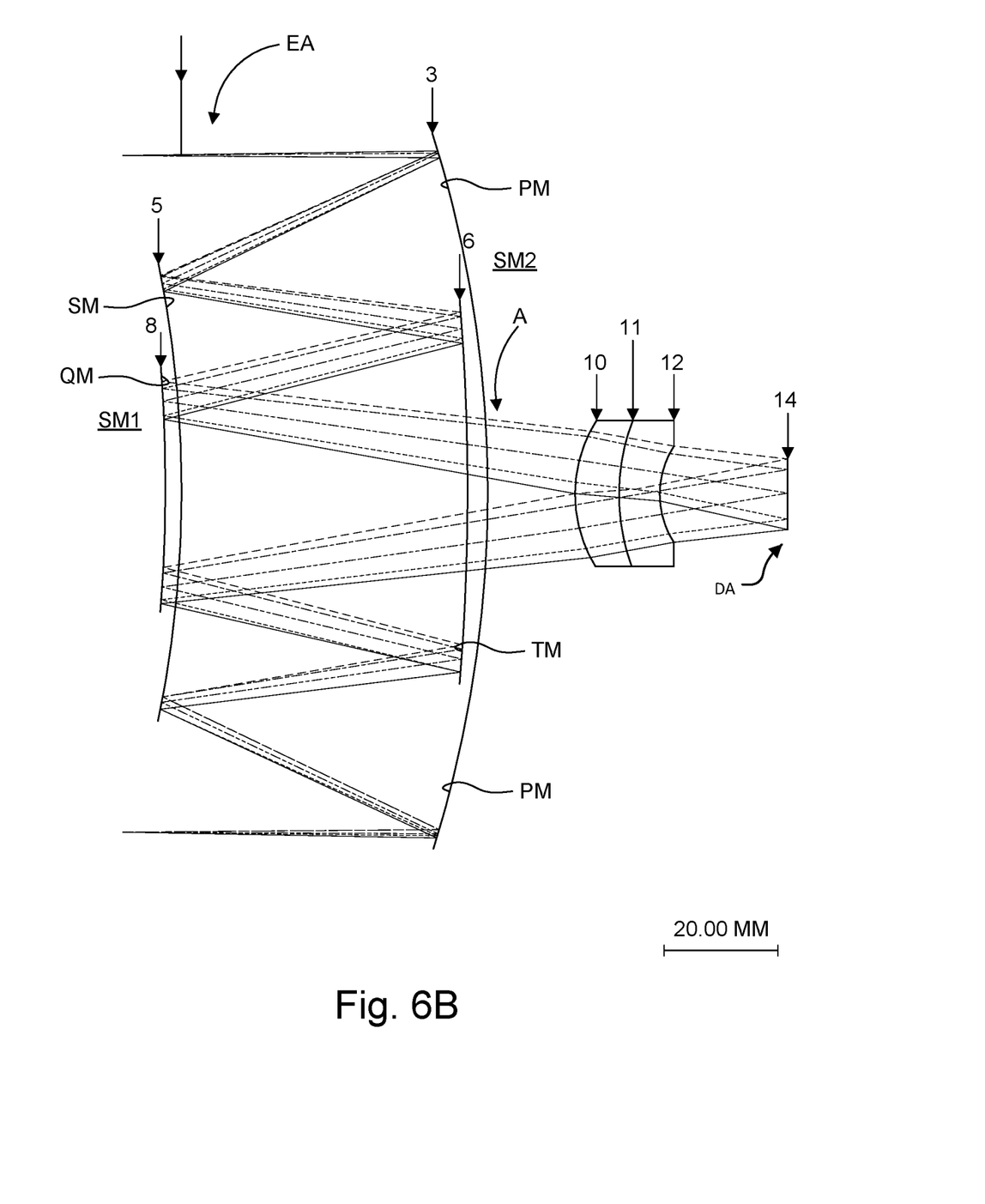

FIGS. 6A and 6B show a longitudinal cross section view of a catadioptric telescope optical according to the present invention. Both figures show the same design. Some rays have been removed in FIG. 6B for clarity.

Light enters through the entrance aperture EA. The light is reflected from the primary mirror PM, to the secondary mirror SM, to the tertiary mirror TM, to the quaternary mirror QM and then through the aperture A in the first mirror substrate MS1. As in previous designs, the primary mirror PM and tertiary mirror TM are formed on the first mirror substrate MS1, and the secondary mirror SM and quaternary mirror QM are formed on the second mirror substrate MS2.

After passing through the aperture A in the first mirror substrate MS1, the light is conditioned by a first lens L1 and a second lens L2 and then forms an image at the image plane F.

The following table provides some details for the system performance of the catadioptric telescope of FIGS. 6A and 6B:

| INFINITE CONJUGATES | |
|---|---|
| EFL | 249.9998 |
| BFL | 0.0128 |
| FFL | −750.7720 |
| FNO | 2.6882 |
| IMG DIS | 0.0000 |
| OAL | 71.6043 |
| PARAXIAL IMAGE | |
| HT | 4.8000 |
| ANG | 1.0999 |
| ENTRANCE PUPIL | |
| DIA | 93.0000 |
| THI | 0.0000 |
| EXIT PUPIL | |
| DIA | 30.9681 |
| THI | −83.2347 |

The following table defines the surfaces for the various elements:

| Surface # | Surface Name | Surface Type | Y Radius | Thickness | Glass | Glass 2 | Refract Mode |
|---|---|---|---|---|---|---|---|
| Object | | Sphere | Infinity | Infinity | AIR | | Refract |
| Stop | stop | Sphere | Infinity | 2.5000 | AIR | | Refract |
| 2 | Entrance | Sphere | Infinity | 33.6043 | AIR | | Refract |
| 3 | Mirror 1 | Asphere | −183.2561 | −33.6043 | AIR | | Refract |
| 4 | | Sphere | Infinity | −2.5000 | AIR | | Refract |
| 5 | Mirror 2 | Sphere | −174.1218 | 33.6043 | AIR | | Refract |
| 6 | Mirror 3 | Asphere | −508.2118 | −33.6043 | AIR | | Refract |
| 7 | | Sphere | Infinity | −2.0000 | AIR | | Refract |
| 8 | Mirror 4 | Sphere | −225.2933 | 33.6043 | AIR | | Refract |
| 9 | | Sphere | Infinity | 15.0000 | AIR | | Refract |
| 10 | back clearance | Asphere | 20.9649 | 5.0000 | NBK7_SCHO | | Refract |
| 11 | | Sphere | 29.4760 | 5.0000 | NSF5_SCHO | | Refract |
| 12 | | Sphere | 17.6276 | 15.0000 | AIR | | Refract |
| 13 | | Sphere | Infinity | 0.0000 | AIR | | Refract |
| Image | | Sphere | Infinity | 0.0000 | AIR | | Refract |

Surface 3 corresponds to the primary mirror PM; surface 5 corresponds to the secondary mirror SM; surface 6 corresponds to the tertiary mirror TM; and surface 8 corresponds to the quaternary mirror QM. Surface 10 corresponds to the front surface of the first lens, Surface 11 corresponds to the back surface of the first lens L1 and the front surface of the second lens, and Surface 12 corresponds to the back surface of the second lens L2.

From this table, the only aspheric elements that are required are the primary mirror PM, the tertiary mirror TM, and the front surface of the first lens.

Here is the prescription for the primary mirror PM:

| Asphere | |
|---|---|
| Parameter | Value |
| Y Radius | −183.2561 |
| Conic Constant (K) | −1.0522 |

-continued

Asphere

| Parameter | Value |
| --- | --- |
| $4^{th}$ Order Coefficient (A) | −4.0769e−009 |
| $6^{th}$ Order Coefficient (B) | −1.5103e−013 |
| $8^{th}$ Order Coefficient (C) | 6.7707e−017 |
| $10^{th}$ Order Coefficient (D) | −9.6421e−021 |

Here is the prescription for the tertiary mirror TM:

Asphere

| Parameter | Value |
| --- | --- |
| Y Radius | −508.2118 |
| Conic Constant (K) | 65.5937 |
| $4^{th}$ Order Coefficient (A) | −1.6234e−007 |
| $6^{th}$ Order Coefficient (B) | 5.3449e−011 |
| $8^{th}$ Order Coefficient (C) | −2.7574e−014 |
| $10^{th}$ Order Coefficient (D) | 1.5401e−017 |

Here is the prescription for the front surface of the first lens:

Asphere

| Parameter | Value |
| --- | --- |
| Y Radius | 20.9649 |
| Conic Constant (K) | 2.2677 |
| $4^{th}$ Order Coefficient (A) | −3.6251e−005 |
| $6^{th}$ Order Coefficient (B) | −2.7219e−007 |
| $8^{th}$ Order Coefficient (C) | 1.3784e−009 |
| $10^{th}$ Order Coefficient (D) | −2.1953e−011 |

Aspheric Surface (ASP)

Surface in which profile differs from that of a spherical or piano surface are termed aspheric. In CODE V, there are several types of aspherics. The most common is a polynomial asphere whose SAG is defined by the equation $$z(r) = \frac{cr^2}{1+[1-(1+K)c^2r^2]^{1/2}} + Ar^4 + Br^6 + Cr^8 + Dr^{10} + Er^{12} + Fr^{14} + Gr^{16} + Hr^{18} + Jr^{20}$$

Figure 7A:
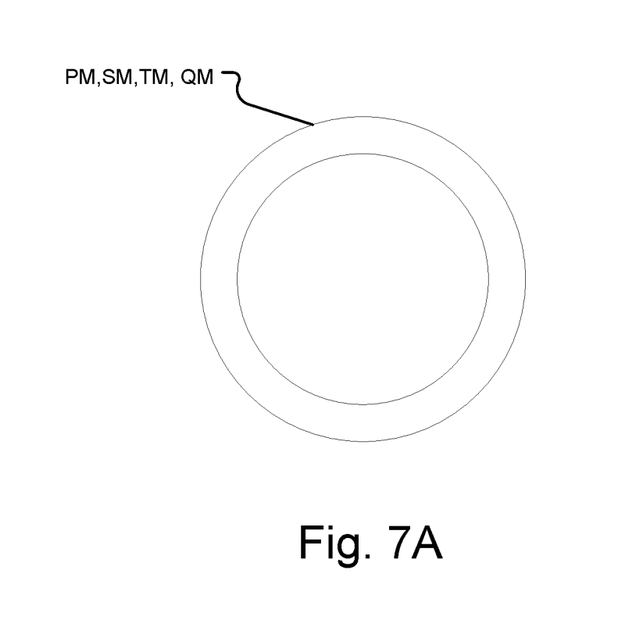
FIG. 7A is an end view, looking along the optical axis of a mirror of the folded imaging system of FIGS. 2A, 3, 4, 5, 6A, and 6B according to one embodiment.
Figure 7B:
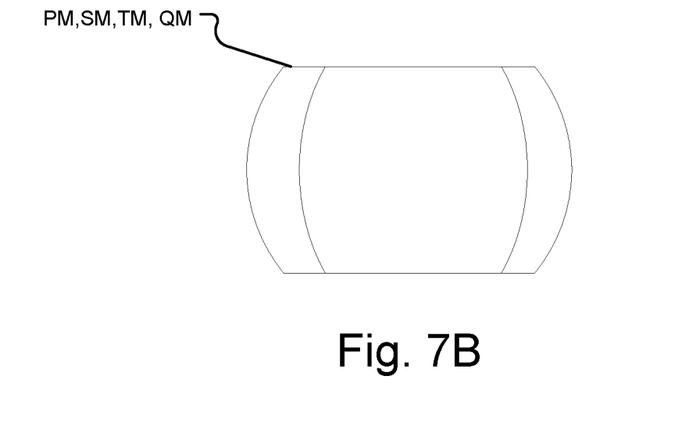
FIG. 7B is an end view, looking along the optical axis of a mirror of the folded imaging system of FIGS. 2A, 3, 4, 5, 6A, and 6B according to another embodiment having a segmented circular profile.

FIGS. 7A and 7B show two potential shapes for each of the mirrors, i.e., primary mirror PM, secondary mirror SM, tertiary mirror TM, and quaternary mirror QM of the folded imaging systems of FIGS. 2A, 3, 4, 5, 6A, and 6B according to different embodiments. As shown in FIG. 7A, in one embodiment, the mirrors when viewed along the optical axis are annular. As shown in FIG. 7B, in another embodiment, the mirrors have segmented-circular profiles when viewed along the optical axis.

To further control the boresight of the folded imaging systems of FIGS. 2A, 3, 4, 5, 6A, and 6B according to different embodiments, an auxiliary pointing system is mounted in front of the imaging systems in some embodiments. This auxiliary pointing system in some cases is an articulated fold mirror or prism, mounted in front of the mirror system. A Risley prism is another option. This fold mirror, prism, or prism system is actuated in order to provide fine control and vibration/shock isolation in the pointing of the mirror system's boresight.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical system, comprising:
    a first mirror substrate having a primary mirror and a tertiary mirror;
    a second mirror substrate opposing the first mirror substrate and having a secondary mirror and a quaternary mirror; and
    a piston for translating the second mirror substrate relative to the first mirror substrate; and
    wherein the primary mirror and the tertiary mirror are aspheric and the secondary mirror and the quaternary mirror are flat or spherical.

2. The optical system of claim 1, wherein the optical system is an imaging system, projecting system or combined imaging and projecting system.

3. The optical system of claim 1, further comprising a complex dielectric coating comprising at least one dichroic mirror separated from another mirror by a separation layer.

4. The optical system of claim 1, further comprising a complex dielectric coating comprising at least a first dichroic mirror, separated from a second dichroic mirror separated from another mirror by respective separation layers.

5. The optical system of claim 1, further comprising a lens for conditioning light passing through an aperture in the first mirror substrate.

6. The optical system of claim 1, further comprising a lens for conditioning light passing through an aperture in the first mirror substrate, wherein the lens has at least one aspheric surface.

7. The optical system of claim 1, further comprising a baffle between the primary mirror and the tertiary mirror.

8. The optical system of claim 1, further comprising a baffle between the secondary mirror and the quaternary mirror.

9. The optical system of claim 1, further comprising a detector assembly comprising one or more beamsplitters and two or more image sensors.

10. The optical system of claim 1, further comprising an articulated fold mirror, or prism, mounted in front of the optical system.

11. The optical system of claim 1, further comprising a Risley prism mounted in front of the mirror system.

12. The optical system of claim 1, operating as a multiband star tracker.

13. The optical system of claim 1, further comprising a patterned optical surface on at least one of the mirrors.

14. The optical system of claim 1, wherein the optical system has a segmented-circular profile.

15. An imaging system, comprising:
    a first mirror substrate having an aspheric primary mirror and an aspheric tertiary mirror;
    a second mirror substrate opposing the first mirror substrate and having a spherical secondary mirror and a spherical quaternary mirror; and
    a piston for translating the second mirror substrate relative to the first mirror substrate.

16. The imaging system of claim 15, wherein the primary mirror comprises a complex dielectric coating comprising at least one dichroic mirror separated from another mirror by a separation layer.

17. The imaging system of claim 15, wherein the primary mirror comprises a complex dielectric coating comprising at least a first dichroic mirror, separated from a second dichroic mirror separated from another mirror by respective separation layers.

18. The imaging system of claim 15, further comprising a detector assembly comprising one or more beamsplitters and two or more image sensors.

19. An optical system, comprising:
- a first mirror substrate having a primary mirror and a tertiary mirror;
- a first baffle between the primary mirror and the tertiary mirror;
- a second mirror substrate opposing the first mirror substrate and having a secondary mirror and a quaternary mirror;
- a second baffle between the secondary mirror and the quaternary mirror; and
- a piston for translating the second mirror substrate relative to the first mirror substrate;
- wherein the primary mirror and the tertiary mirror are aspheric and the secondary mirror and the quaternary mirror are flat or spheric.

20. The optical system of claim 19, further comprising:
- a first beamsplitter for splitting off a visible band to a visible image sensor of light from the quanternary mirror;
- a second beamsplitter for splitting off short wave infrared and near infrared light to a SWIR/NIR image sensor of light from the first beamsplitter;
- a third beamsplitter for splitting off mid-wave infrared light to a MWIR image sensor of light from the second beamsplitter; and
- a long wave infrared image sensor for detecting light received from the third beamsplitter.

* * * * *